(12) United States Patent
Lambert et al.

(10) Patent No.: US 9,985,828 B2
(45) Date of Patent: *May 29, 2018

(54) SYSTEM AND METHOD FOR ENHANCING SERVER MEDIA THROUGHPUT IN MISMATCHED NETWORKS

(71) Applicant: DELL PRODUCTS, LP, Round Rock, TX (US)

(72) Inventors: Timothy M. Lambert, Austin, TX (US); Wade A. Butcher, Cedar Park, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/169,226

(22) Filed: May 31, 2016

(65) Prior Publication Data

US 2016/0277238 A1    Sep. 22, 2016

Related U.S. Application Data

(63) Continuation of application No. 13/737,380, filed on Jan. 9, 2013, now Pat. No. 9,432,458.

(51) Int. Cl.
| | |
|---|---|
| *G06F 15/16* | (2006.01) |
| *H04L 29/08* | (2006.01) |
| *H04L 12/24* | (2006.01) |
| *H04L 12/807* | (2013.01) |
| *H04L 29/06* | (2006.01) |
| *H04L 12/26* | (2006.01) |
| *H04L 12/801* | (2013.01) |

(52) U.S. Cl.
CPC ...... *H04L 41/0803* (2013.01); *H04L 43/0876* (2013.01); *H04L 47/10* (2013.01); *H04L 47/27* (2013.01); *H04L 67/1097* (2013.01); *H04L 69/163* (2013.01); *H04L 47/12* (2013.01)

(58) Field of Classification Search
CPC ........ H04L 47/10–47/41; H04L 69/16–69/169
See application file for complete search history.

(56) References Cited

U.S. PATENT DOCUMENTS

| | | |
|---|---|---|
| 5,859,853 A | 1/1999 | Carlson |
| 6,298,070 B1 | 10/2001 | Carlson et al. |
| 6,496,481 B1 | 12/2002 | Wu et al. |

(Continued)

FOREIGN PATENT DOCUMENTS

WO    WO 97/49209 A1    12/1997

*Primary Examiner* — David Lazaro
*Assistant Examiner* — Julian Chang
(74) *Attorney, Agent, or Firm* — Larson Newman, LLP

(57) ABSTRACT

An information handling system includes a transmission queue and a media client module. The media client module is in communication with the transmission queue. The media client module receives a disk command, stores a first number of packets in the transmission queue in response to the disk command, and transmits the first number of packets to a server associated with the disk command. The media client module also receives a restart message, stops transmission of the first number of packets in response to the restart message, calculates a delay between burst of packets and sets a second number of packets based on the restart message, stores a second number of packets in the transmission queue, and transmits the second number of packets to the server.

20 Claims, 5 Drawing Sheets

(56) References Cited

U.S. PATENT DOCUMENTS

| | | | |
|---|---|---|---|
| 6,570,848 B1 | 5/2003 | Loughran et al. | |
| 6,608,818 B1 | 8/2003 | Abrol et al. | |
| 6,839,321 B1 | 1/2005 | Chiruvolu | |
| 7,035,214 B1* | 4/2006 | Seddigh | H04L 1/1635 370/231 |
| 7,561,523 B1 | 7/2009 | Revsin et al. | |
| 7,626,966 B1* | 12/2009 | Ruiter | H04M 1/725 370/310 |
| 7,912,060 B1 | 3/2011 | Chen et al. | |
| 7,970,875 B1 | 6/2011 | Shaffer et al. | |
| 7,983,156 B1 | 7/2011 | Papirakis | |
| 8,019,899 B2 | 9/2011 | Zhang et al. | |
| 8,437,264 B1 | 5/2013 | Go | |
| 8,503,340 B1 | 8/2013 | Xu | |
| 8,626,820 B1 | 1/2014 | Levy | |
| 2001/0025239 A1 | 9/2001 | Hakenberg et al. | |
| 2002/0009072 A1 | 1/2002 | Halme | |
| 2002/0027884 A1 | 3/2002 | Halme | |
| 2002/0027918 A1 | 3/2002 | Burmeister et al. | |
| 2002/0124096 A1* | 9/2002 | Loguinov | H04L 1/0001 709/230 |
| 2002/0181494 A1 | 12/2002 | Rhee | |
| 2003/0023746 A1* | 1/2003 | Loguinov | H04L 47/10 709/235 |
| 2004/0064577 A1 | 4/2004 | Dahlin et al. | |
| 2004/0070678 A1 | 4/2004 | Toyama et al. | |
| 2004/0163008 A1* | 8/2004 | Kim | H04L 69/40 714/4.1 |
| 2004/0165538 A1 | 8/2004 | Swami | |
| 2004/0198223 A1* | 10/2004 | Loh | H04L 47/10 455/41.1 |
| 2004/0264366 A1* | 12/2004 | Swami | H04L 1/1635 370/229 |
| 2004/0264377 A1 | 12/2004 | Kilkki et al. | |
| 2005/0160098 A1 | 7/2005 | Campbell et al. | |
| 2005/0226150 A1 | 10/2005 | Santos et al. | |
| 2005/0249115 A1 | 11/2005 | Toda et al. | |
| 2005/0259577 A1 | 11/2005 | Sin | |
| 2005/0289395 A1 | 12/2005 | Katsuyama et al. | |
| 2006/0129693 A1 | 6/2006 | LeCroy et al. | |
| 2006/0153152 A1 | 7/2006 | Kondylis et al. | |
| 2006/0206579 A1* | 9/2006 | Connor | H04L 12/5693 709/214 |
| 2006/0233118 A1 | 10/2006 | Funk et al. | |
| 2006/0262759 A1 | 11/2006 | Bahl et al. | |
| 2007/0053303 A1 | 3/2007 | Kryuchkov | |
| 2007/0086335 A1 | 4/2007 | McCanne et al. | |
| 2007/0217448 A1 | 9/2007 | Luo et al. | |
| 2007/0223379 A1* | 9/2007 | Sivakumar | H04L 47/10 370/235 |
| 2007/0234170 A1 | 10/2007 | Shao et al. | |
| 2008/0037420 A1* | 2/2008 | Tang | H04L 1/1607 370/229 |
| 2008/0181109 A1 | 7/2008 | Igarashi et al. | |
| 2008/0259799 A1 | 10/2008 | van Beek | |
| 2009/0271681 A1 | 10/2009 | Piret et al. | |
| 2009/0316579 A1* | 12/2009 | Tang | H04L 47/10 370/231 |
| 2010/0008248 A1 | 1/2010 | Constantine et al. | |
| 2010/0020689 A1* | 1/2010 | Tang | H04L 47/10 370/235 |
| 2010/0040050 A1 | 2/2010 | Johnston | |
| 2010/0110922 A1 | 5/2010 | Ketheesan et al. | |
| 2010/0111029 A1 | 5/2010 | Chou et al. | |
| 2010/0111095 A1 | 5/2010 | Trossell et al. | |
| 2010/0153809 A1 | 6/2010 | Duan et al. | |
| 2010/0165858 A1 | 7/2010 | Morita | |
| 2010/0183024 A1* | 7/2010 | Gupta | H04L 1/0072 370/463 |
| 2010/0238828 A1 | 9/2010 | Russell | |
| 2011/0019555 A1 | 1/2011 | Gotoh et al. | |
| 2011/0141922 A1 | 6/2011 | Kotrla et al. | |
| 2011/0255403 A1* | 10/2011 | Papirakis | H04L 47/25 370/230.1 |
| 2012/0106571 A1* | 5/2012 | Jeon | H04L 47/10 370/465 |
| 2012/0226802 A1 | 9/2012 | Wu et al. | |
| 2012/0272280 A1 | 10/2012 | Kazawa | |
| 2012/0311066 A1 | 12/2012 | Watson et al. | |
| 2012/0314573 A1 | 12/2012 | Edwards et al. | |
| 2012/0314761 A1 | 12/2012 | Melnyk et al. | |
| 2013/0034012 A1 | 2/2013 | Oshiba | |
| 2013/0044598 A1 | 2/2013 | Zhang et al. | |
| 2013/0170342 A1 | 7/2013 | Alnuem | |
| 2014/0112148 A1 | 4/2014 | Flinta et al. | |
| 2015/0282002 A1 | 10/2015 | Turner et al. | |

* cited by examiner

SYSTEM AND METHOD FOR ENHANCING SERVER MEDIA THROUGHPUT IN MISMATCHED NETWORKS

CROSS-REFERENCE TO RELATED APPLICATION(S)

This application is a continuation of U.S. patent application Ser. No. 13/737,380, entitled "System and Method for Enhancing Server Media Throughput in Mismatched Networks," filed on Jan. 9, 2013, the disclosure of which is hereby expressly incorporated by reference in its entirety.

FIELD OF THE DISCLOSURE

This disclosure generally relates to information handling systems, and more particularly relates to a system and method for enhancing server media throughput in mismatched networks.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
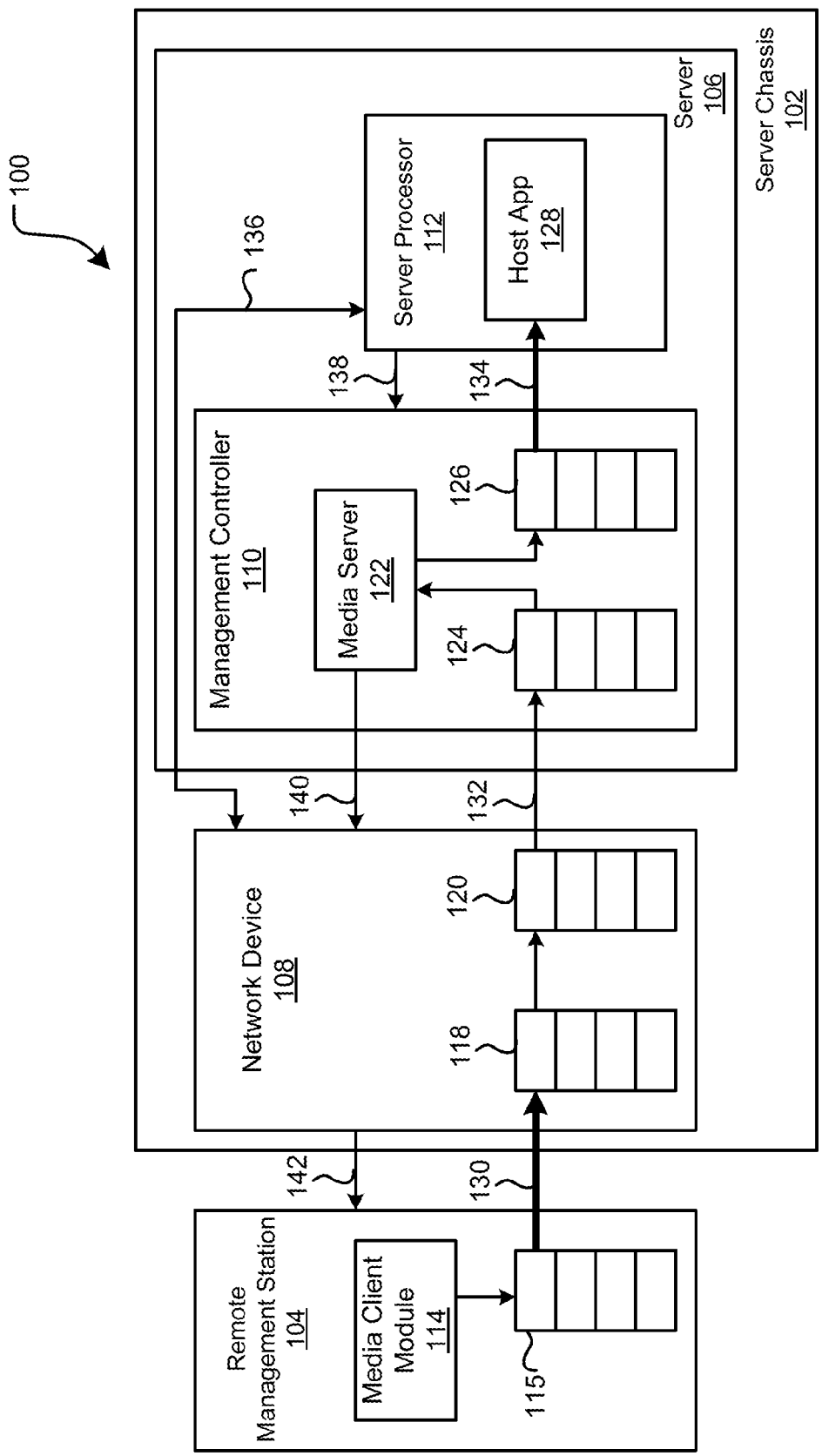
FIG. 1 is a block diagram of a network.

FIG. 1 illustrates a network 100 including servers, devices, and/or information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The network 100 includes a server chassis 102 and a remote server/remote management station 104. In an embodiment, the server chassis 102 can be a single chassis, a server rack for multiple servers, or the like. The server chassis 102 includes a server 106 and a network device 108. In different embodiments, the network device 108 can be a switch, a chassis management controller, a local area network (LAN) on a motherboard (LOM), or the like. The server 106 includes a management controller 110 and a server processor 112. In different embodiments, the management controller 110 can be any type of controller for the server 106, such as an interactive Dell Remote Access controller or the like.

The remote management station 104 includes a media client module 114 and a transmission queue 116. The network device 108 includes a receive queue 118 and a transmission queue 120. The management controller 110 includes a media server 122, a receive queue 124, and a transmission queue 126. The server processor 112 can execute a host application 128. The network device 108 can communicate with the remote management station 104 via communication links 130 and 142. The network device 108 is in communication with the management controller via communication links 132 and 140, and with the server processor 112 via the communication link 136. The management controller 110 is in communication with the server processor 112 via the communication links 134 and 138.

During operation, the host application 128 running in the server processor 112 can request data from a media device that is located at the remote management station 104. For example, the host application 128 can be an installation process and the media device in the remote management station 104 can include data files for the installation process. The host application 128 can send a disk command, such as a read request, to the management controller 110 via the communication link 138. The disk command can be routed to the media server 122, which in turn can communicate the disk command to the media client module 114 of the remote management station 104 via the network device 108 and the communication links 140 and 142.

When the media client module 114 receives the disk command, the media client module can generate a number of packets from the data stored on the media device. In an embodiment, the packet can be user datagram protocol (UDP) packets. The media client module 114 can append a packet order number to a header of each of the packets, such that the media server 122 can identify whether all of the packets are received and whether the packets are received in a proper order. The media client module 114 can then place a first number of packets in the transmission queue 116 of the remote management station 104. The first packet placed in the transmission queue 116 can have a particular packet order number, such as one. The packet order number of the first packet can be set as the starting packet order number 'n' for the first number of packets. The media client module 114 can also set a time stamp 't' associated with the packets to zero, and can start a timer having an initial value equal the value of the time stamp 't.' The remote management station 104 can then start transmitting the packets from the transmission queue 116 to the network device 108 of the server chassis 102 via the communication link 130. In an embodiment, a speed of the communication link 130 can be substantially equal to one Gigabyte per second. The remote management station 104 can transmit the packets in burst, such that only a specific number of packets are transmitted during a time period 'T.'

The network device 108 can place the packets in the receive queue 118 as each of the packets are received. The network device 108 can then place the packets in the transmission queue 120 to be sent to the server 106. In an embodiment, the server chassis 102 can be a chassis management controller, such that the network device 108 can be a connected to multiple servers within the server chassis and can include multiple transmission queues for the different server. Thus, the network device 108 can also determine the server associated with the packet by information stored in the headers of the packet, and can place the packets into a queue that corresponds with the server identified in the headers of the packets.

The network device 108 can then transmit the packets from the transmission queue 120 to the management controller 110 via the communication link 132. In an embodiment, the communication link 132 can have a slower speed than the communication link 130, such that the packets can be received in the network device 108 faster than packets are transmitted. For example, the communication link 132 can have a transmission speed substantially equal to one hundred megabits per second. In this situation, a queue overflow can occur in either the receive queue 118 or the transmission queue 120, such that packets can be dropped and/or lost in the network device 108. Thus, one or more packets can be lost before the packets are received in the management controller 110 and placed in the receive queue 124. When a packet is dropped the transmission of the total number of packets should be stopped and a new transmission started. Thus, if the packets cannot be transmitted on the communication link 132 at the same speed that the packets are received on the communication link 130, the overall transmission speed will drop below the transmission speed of the communication link 132 as a result of multiple restarts of the transmission.

The media server 122 can retrieve the packets out of the receive queue 124 and then place the packets in the transmission queue 126 to be sent to the host application 128 in the same order that the packets are received in the management controller 110. The management controller 110 can send the packets to the host application 128 via communication link 134, which can be a universal serial bus (USB) communication link or the like. The communication link 134 preferably has a transmission speed that is higher than the transmission speed of the communication link 132, such that the communication link 132 causes the delay in the packet transmission through the network 100.

The media server 122 can also determine whether any packet has been received out of order based on the packet order identified in each of the packet headers. If the media server 122 determines that a packet has been received out of order, the media server can stop placing packets in the transmission queue 126 and can flush the receive queue 124. The media server 122 can then send a restart message to the media client module 114 via the network device 108 and the communication links 140 and 142. The restart message can include a missing packet order number 'p' of the missing packet. The media server 122 can also continue to flush the receive queue 124 until a packet with the missing packet order number is identified in the receive queue by the media server.

The media client module 114 can receive the restart message. In response to receiving the restart message, the media client module 114 can store a current packet order number 's,' and can set the time stamp 'T' equal to a current timer value 't,' and can set a next number of packets to the difference between the missing packet order number 'p' and the starting packet order number 'n'. The media client module 114 can also stop transmitting packets to the network device 108, and can flush the transmission queue 116. The media client module 114 can then calculate a delay to include between bursts of packets. The delay can be calculated based on the time stamp T multiplied by one minus the difference between the missing packet order number 'p' and the starting packet order number 'n' divided by the difference between the current packet order number 's' and the starting packet order number 'n.' Thus, the delay can be calculated using the equation given below:

$$\text{Delay} = T * \left(1 - \frac{(p-n)}{(s-n)}\right)$$

Where:
T=current time stamp,
p=missing packet order number,
n=starting packet order number, and
s=current packet order number.

After calculating the delay between burst of packets, the media client module 114 can reset the time stamp and timer to zero. The media client module 114 can the place the next number of packets into the transmission queue 116 starting with the packet associated with the missing packet order number as the first packet. Thus, the media client module 114 can reinitialize the starting packet order number to the missing packet order number. The media client module 114 can then continue transmitting the packets as described above until another restart message is received or until the disk command request has been completed.

Figure 2:
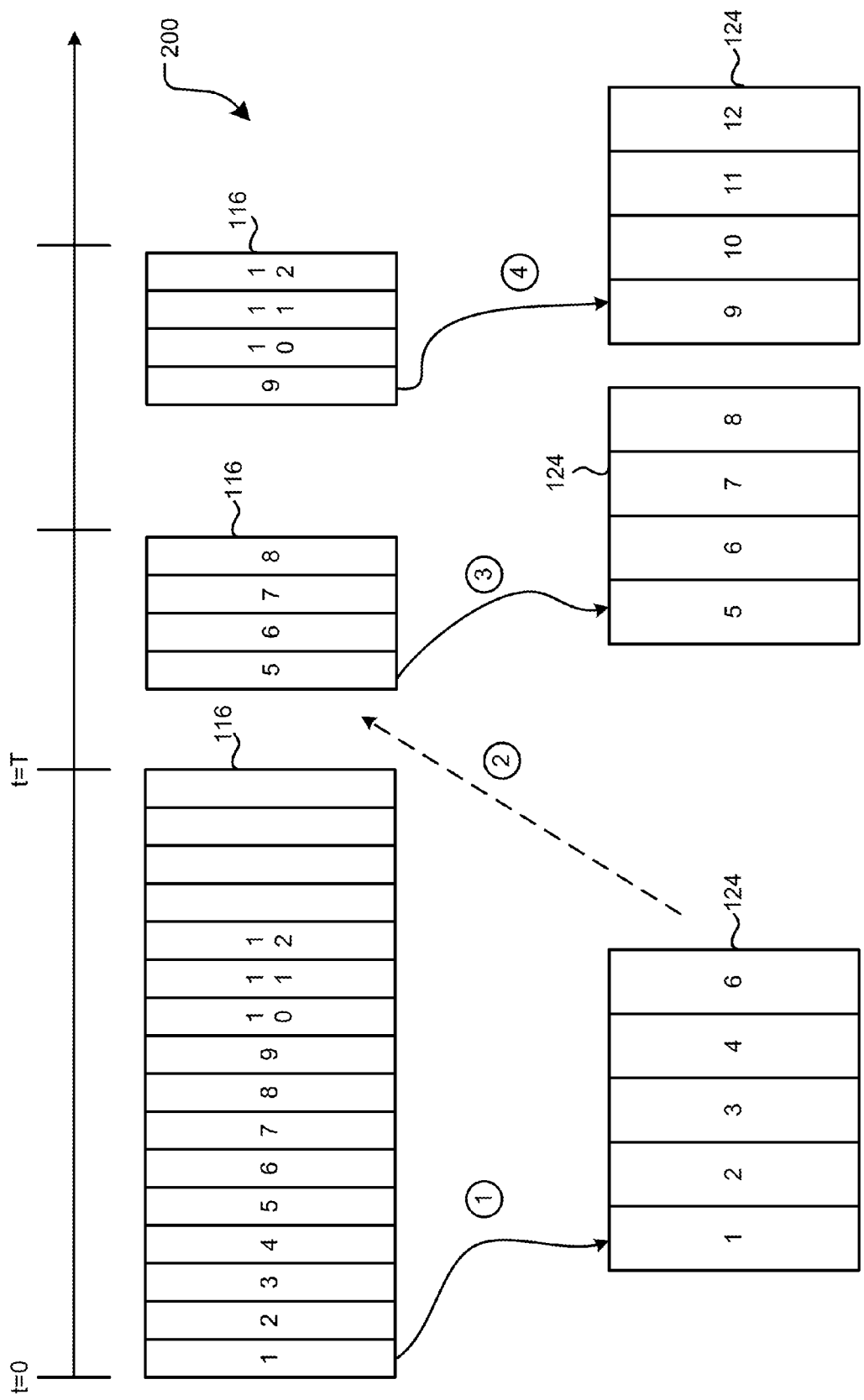
FIG. 2 is a diagram of data packet transfers between information handling systems of the network.

FIG. 2 shows a diagram 200 illustrating packet transfers between the transmission queue 116 of the remote management station 104 and the receive queue 124 in the management controller 110. As described above, the media client module 114 of FIG. 1 can place a first number of packets to be sent to the host application 128 in the transmission queue 116 in response to the media client module receiving a disk command. For example, the media client module 114 can place twelve packets in the transmission queue 116. At step 1, the remote management station 104 can start transmitting the packets from the transmission queue 116 to the receive queue 124 of the management controller 110.

The media server 122 can determine whether a packet is received in the receive queue 124 out of order. If a packet is received out of order, such as packet number six being placed in the receive queue 124 directly after packet number four, the media server 122 can send the restart message to the media client 114 at step 2. The media server 122 can also flush the receive queue 124. The media client module 114 can then receive the restart message and can calculate the delay and set a new number of packets to transmit in a single burst as described above.

For example, the media client module 114 can determine that only four packets should be transmitted per burst of packets in response to subtracting the starting packet order number, such as one, from the missing packet order number, such as five. Thus, the media client module 114 can place only four packets in the transmission queue 116 at a time starting with the packet having the same packet order number as the missing packet order number indicated in the restart message. For example, the media client module 114 can place packets with packet order numbers five through eight in the transmission queue 116. The remote management station 104 can then transmit the four packets in the transmission queue 116 to the management controller 110 at step 3.

The management controller 110 can receive the packets from the remote management station 104 and can place the packets in the receive queue 124. The media server 122 can then verify that all of the packets are received in the proper order. If the media client module 114 does not receive another restart message, the media client module can place another four packets in the transmission queue 116 after the delay calculated in response to the first restart message. The remote management station 104 can then transmit the packets located in the transmission queue 116 to the receive queue 124 of the management controller 110 at step 4. Additionally, the management controller 110 can continue to transmit the packs until a new restart message is received, or until all of the packets associated with the disk command have been transmitted.

Figure 3:
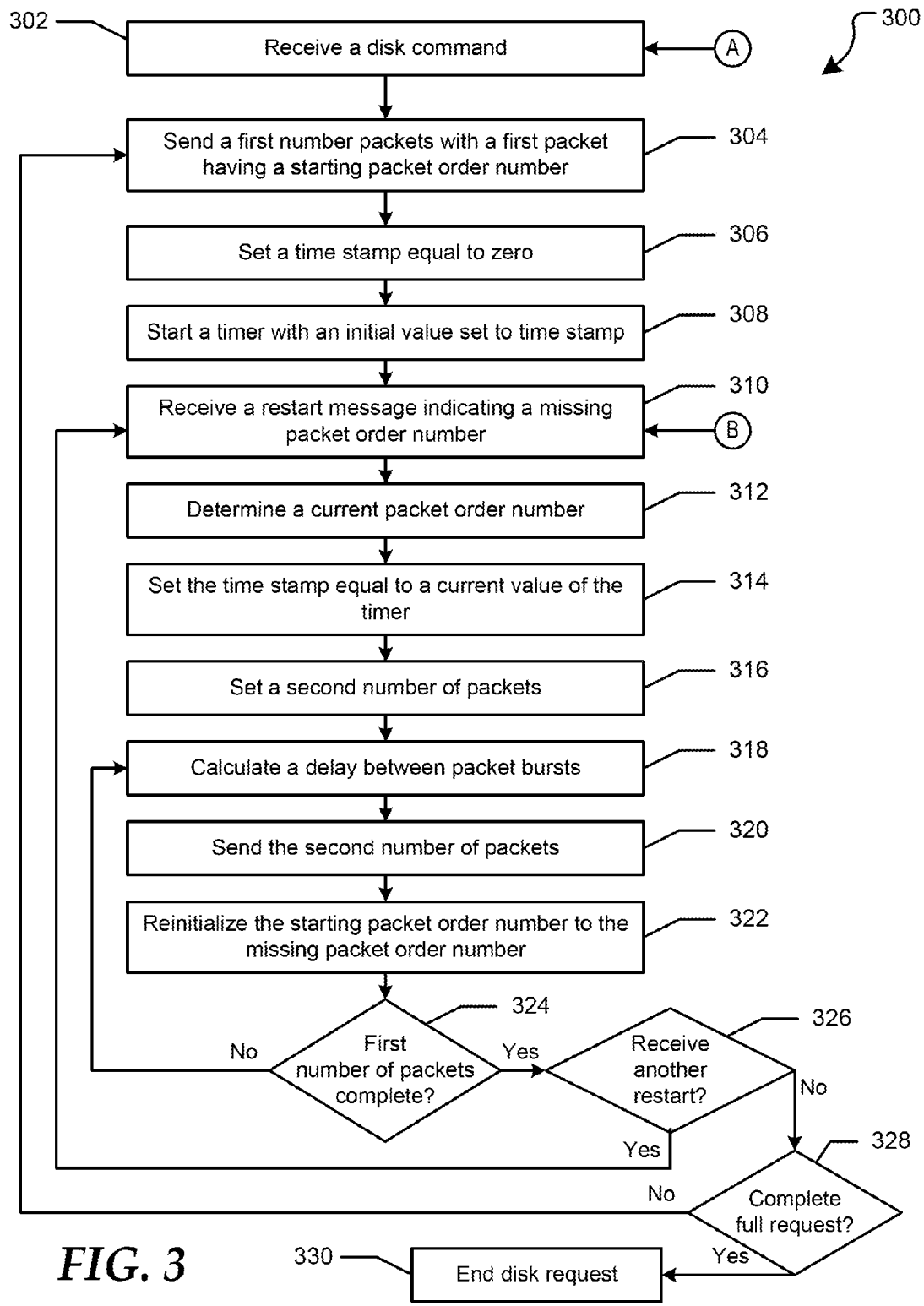
FIG. 3 is a flow diagram of a method for adjusting a transmission rate of packets in the network.

FIG. 3 shows a flow diagram of a method 300 for adjusting a transmission rate of packets in the network 100. At block 302, a disk command is received at a media client module of a remote management station. The disk command can be received from a host application of a destination server, and the disk command can be a read request for a media device located within the remote management station. A first number of packets are sent to the host application at block 304. In an embodiment, the first number of packets can include a first packet having a starting packet order number, such as one. At block 306, a time stamp is set to zero. A timer is started with an initial value equal to the value of the time stamp at block 308.

At block 310, a restart message is received. The restart message can indicate a missing packet order number associated with a packet that was not received in the destination server. A current packet order number is determined at block 312. In an embodiment, the current packet order number is a packet order number associated with a last packet transmitting from the remote management station prior to the restart message being received. At block 314, the time stamp is set to a current value of the timer. A second number of packets to transmit is set at block 316. In an embodiment, the second number of packets is set to the difference between the missing packet order number and the starting packet order number. At block 318, a delay between transmission burst of packets is determined. The delay can be determined based on the time stamp value multiplied by one minus the difference between the missing packet order number and the starting packet order number divided by the difference between the current packet order number and the starting packet order number.

At block 320, the starting packet order number is reinitialized to the missing packet order number. The second number of packets is transmitted at block 322. The second number of packets can be a burst of packets beginning with the new starting packet order number. At block 324, a determination is made whether the first number of packets has all been transmitted. If the first number of packets has not all been transmitted, the flow diagram continues as stated above at block 318. If the first number of packets has all been transmitted, a determination is made whether another restart message has been received at block 326. If another restart message has been received, the flow diagram continues as stated above at block 310. If another restart message has not been received, a determination is made whether the full read request of the disk command has been completed at block 328. If the full read request of the disk command has not been completed, the flow diagram continues as stated above at block 304. If the full read request of the disk command has been completed, the disk read request is ended at block 330.

Figure 4:
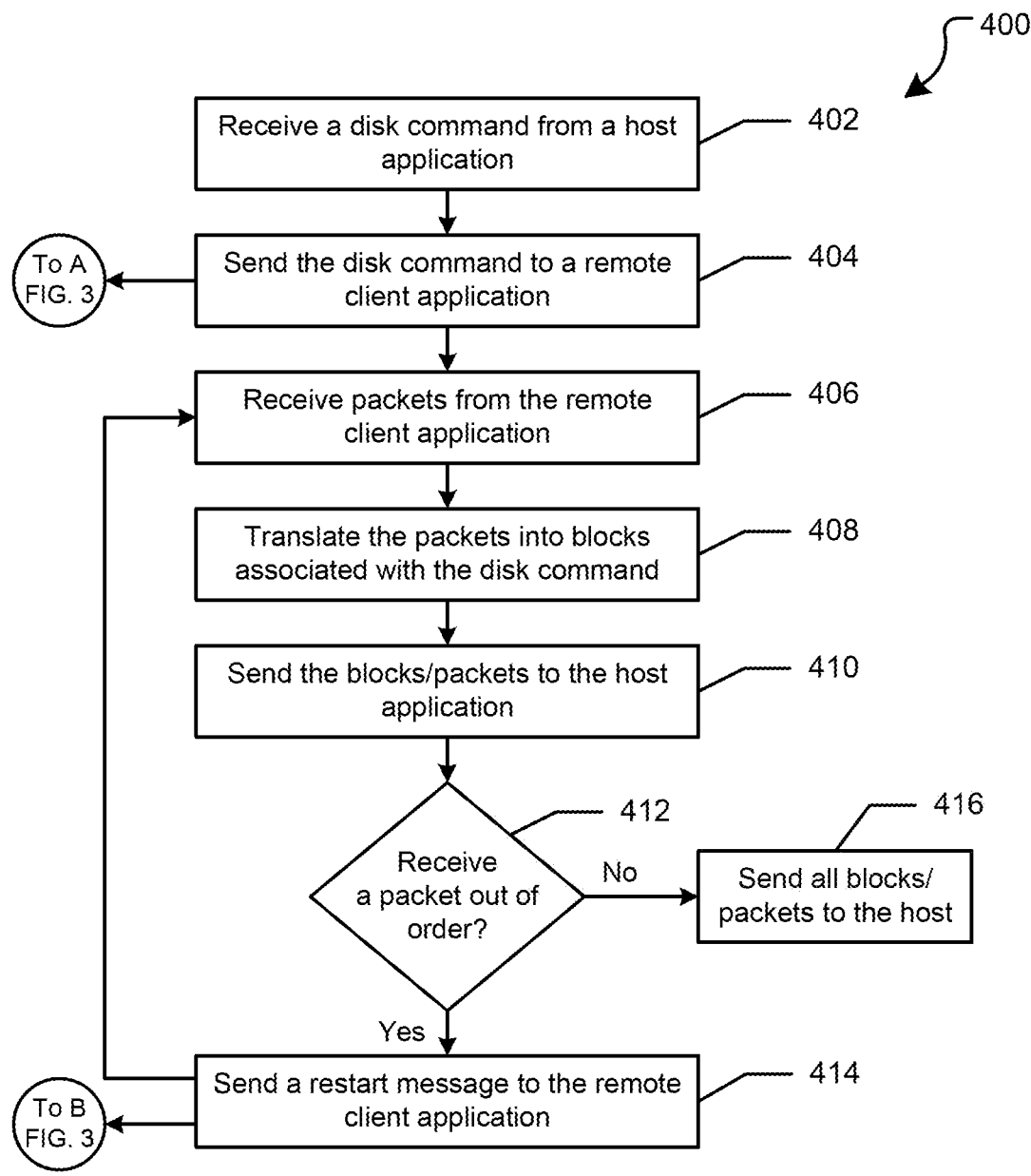
FIG. 4 is a flow diagram of a method for determining whether to request a restart of the packet transmission.

FIG. 4 shows a flow diagram of a method 400 for determining whether to request a restart of the packet transmission. At block 402, a disk command is received from a host application. The disk command is sent to a remote client at block 404. In an embodiment, the disk command being sent can cause block 302 of the flow diagram 300 in FIG. 3 to occur. At block 406, packets are received from the client application. The received packets are translated into blocks associated with the disk command at block 408. At block 410, the blocks/packets are sent to the host application. In an embodiment, the blocks/packets can be sent to the host application via a USB communication link.

At block 412, a determination is made whether a packet is received from the remote client application out of order. If a packet is received out of order, a restart message is sent to the remote client application at block 414. In an embodiment, the restart message can include a missing packet order number, which in turn can indicate a packet order number associated with a packet that was not received in the management controller. The restart message being sent can cause block 310 of the flow diagram 300 in FIG. 3 to occur. If a packet is not received out of order, all blocks/packets are sent to the host application at block 414.

Figure 5:
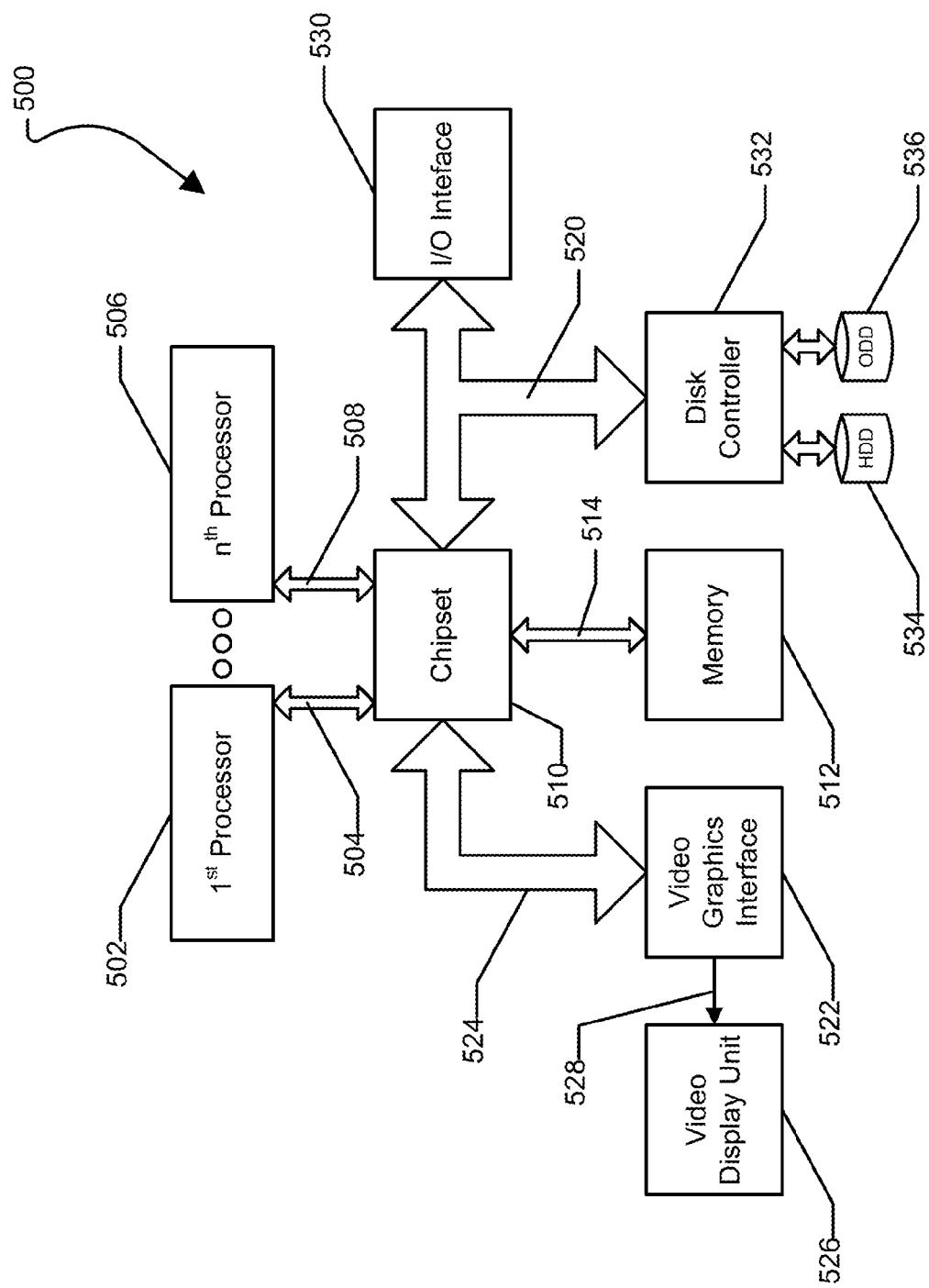
FIG. 5 is a block diagram of a general information handling system.

As shown in FIG. 5, an information handling system 500, such as remote management station 104 or server 106, can include a first physical processor 502 coupled to a first host bus 504 and can further include additional processors generally designated as $n^{th}$ physical processor 506 coupled to a second host bus 508. The first physical processor 502 can be coupled to a chipset 510 via the first host bus 504. Further, the $n^{th}$ physical processor 506 can be coupled to the chipset 510 via the second host bus 508. The chipset 510 can support multiple processors and can allow for simultaneous processing of multiple processors and support the exchange of information within information handling system 500 during multiple processing operations.

According to one aspect, the chipset 510 can be referred to as a memory hub or a memory controller. For example, the chipset 510 can include an Accelerated Hub Architecture (AHA) that uses a dedicated bus to transfer data between first physical processor 502 and the $n^{th}$ physical processor 506. For example, the chipset 510, including an AHA enabled-chipset, can include a memory controller hub and an input/output (I/O) controller hub. As a memory controller hub, the chipset 510 can function to provide access to first physical processor 502 using first bus 504 and $n^{th}$ physical processor 506 using the second host bus 508. The chipset 510 can also provide a memory interface for accessing memory 512 using a memory bus 514. In a particular embodiment, the buses 504, 508, and 514 can be individual buses or part of the same bus. The chipset 510 can also provide bus control and can handle transfers between the buses 504, 508, and 514.

According to another aspect, the chipset 510 can be generally considered an application specific chipset that provides connectivity to various buses, and integrates other system functions. For example, the chipset 510 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 510. The chipset 510 can also be packaged as an application specific integrated circuit (ASIC).

The information handling system 500 can also include a video graphics interface 522 that can be coupled to the chipset 510 using a third host bus 524. In one form, the video graphics interface 522 can be an Accelerated Graphics Port (AGP) interface to display content within a video display unit 526. Other graphics interfaces may also be used. The video graphics interface 522 can provide a video display output 528 to the video display unit 526. The video display unit 526 can include one or more types of video displays such as a flat panel display (FPD) or other type of display device.

The information handling system 500 can also include an I/O interface 530 that can be connected via an I/O bus 520 to the chipset 510. The I/O interface 530 and I/O bus 520 can include industry standard buses or proprietary buses and respective interfaces or controllers. For example, the I/O bus 520 can also include a Peripheral Component Interconnect (PCI) bus or a high speed PCI-Express bus. In one embodiment, a PCI bus can be operated at approximately 33 MHz and a PCI-Express bus can be operated at more than one speed, such as 2.5 GHz, 5 GHz, 8 GHz, and 16 GHz. PCI buses and PCI-Express buses can be provided to comply with industry standards for connecting and communicating between various PCI-enabled hardware devices. Other buses can also be provided in association with, or independent of, the I/O bus 520 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 510 can be a chipset employing a Northbridge/Southbridge chipset configuration (not illustrated). For example, a Northbridge portion of the chipset 510 can communicate with the first physical processor 502 and can control interaction with the memory 512, the I/O bus 520 that can be operable as a PCI bus, and activities for the video graphics interface 522. The Northbridge portion can also communicate with the first physical processor 502 using first bus 504 and the second bus 508 coupled to the $n^{th}$ physical processor 506. The chipset 510 can also include a Southbridge portion (not illustrated) of the chipset 510 and can handle I/O functions of the chipset 510. The Southbridge portion can manage the basic forms of I/O such as Universal Serial Bus (USB), serial I/O, audio outputs, Integrated Drive Electronics (IDE), and ISA I/O for the information handling system 500.

The information handling system 500 can further include a disk controller 532 coupled to the I/O bus 520, and connecting one or more internal disk drives such as a hard disk drive (HDD) 534 and an optical disk drive (ODD) 536 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail in the exemplary embodiments without materially departing from the novel teachings and advantages of the embodiments of the present disclosure. For example, the methods described in the present disclosure can be stored as instructions in a computer readable medium to cause a processor, such as chipset 510, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a transmission queue; and
a hardware media client module in communication with the transmission queue, the hardware media client module configured to receive a disk command, to store a first number of packets in the transmission queue in response to the disk command, to begin transmission of the first number of packets to a first information handling system, to receive a restart message, to stop transmission of the first number of packets in response to the restart message, to set a second number of packets to a difference between a missing packet order number in the restart message and a starting packet order number of the first number of packets, and to transmit the second number of packets to the first information handling system starting with a packet having the missing packet order number.

2. The information handling system of claim 1 wherein the media client server is further configured to determine a current packet order number in response to the restart message, and to utilize the current packet order number to calculate a delay.

3. The information handling system of claim 1 wherein the restart message includes the missing packet order number, and the media client server is configured to utilize the missing packet order number to calculate a delay.

4. The information handling system of claim 3 wherein the media client server is further configured to transmit packets associated with the disk command in a burst of the second number of packets with the calculated delay between the bursts.

5. The information handling system of claim 1, the hardware media client module further to calculate a delay between bursts of packets based on the restart message, wherein the calculated delay is D:

$$D = T * \left(1 - \frac{(p-n)}{(s-n)}\right)$$

where,
T=a current time stamp,
p=a missing packet order number,
n=a starting packet order number, and
s=a current packet order number.

6. The information handling system of claim 1 wherein the hardware media client module is further configured to flush the transmission queue in response to the restart message and prior to the second number of packets being transmitted.

7. The information handling system of claim 1 wherein the hardware media client module is further configured to calculate a delay between a burst of packets in response to a second restart message.

8. The information handling system of claim 1 wherein a network utilized to transmit the first number of packets and the second number of packets has different transmission speeds between different devices of the network, and wherein the different transmission speeds cause a packet to be missed in the server.

9. The information handling system of claim 1 wherein the disk command is a read request of a media device within the information handling system.

10. A method comprising:
receiving, at a media client module, a disk command;
storing a first number of packets in a transmission queue in response to the disk command;
beginning transmission of the first number of packets to a server associated with the disk command;
receiving a restart message including a missing packet order number;
stopping transmission of the first number of packets in response to the restart message;
setting a second number of packets to a difference between a missing packet order number in the restart message and a starting packet order number of the first number of packets; and
transmitting the second number of packets to the server starting with a packet having the missing packet order number.

11. The method of claim 10 further comprising:
determining a current packet order number in response to the restart message; and
utilizing the current packet order number to calculate a delay.

12. The method of claim 10 further comprising:
utilizing the missing packet order number to calculate a delay.

13. The method of claim 12 further comprising:
transmitting packets associated with the disk command in burst of the second number of packets with the calculated delay between the bursts.

14. The method of claim 10 further comprising:
calculating a delay between bursts of packets based on the restart message, wherein the calculated delay is D:

$$D = T * \left(1 - \frac{(p-n)}{(s-n)}\right)$$

where,
T=a current time stamp,
p=a missing packet order number,
n=a starting packet order number, and
s=a current packet order number.

15. The method of claim 10 further comprising:
flushing the transmission queue in response to the restart message and prior to transmitting the second number of packets.

16. The method of claim 10 further comprising:
calculating a delay between bursts of packets in response to a second restart message.

17. The method of claim 10 wherein a network utilized to transmit the first number of packets and the second number of packets has different transmission speeds between different devices of the network, and wherein the different transmission speeds cause a packet to be missed in the server.

18. The method of claim 10 wherein the disk command is a read request of a media device within the information handling system.

19. A network comprising:
a first information handling system including a media server to receive a disk command from an application of a processor, to transmit the disk command, to receive packets associated with the disk command, and to transmit a restart message in response to one of the packets being received out of order; and
a second information handling system including:
a transmission queue; and
a hardware media client module in communication with the transmission queue, the hardware media client module configured to receive the disk command from the media server, to store a first number of packets in the transmission queue in response to the disk command, to begin transmission of the first number of packets to the first information handling system, to receive the restart message, to stop transmission of the first number of packets in response to the restart message, to set a second number of packets to a difference between a missing packet order number in the restart message and a starting packet order number of the first number of packets, and to transmit the second number of packets to the first information handling system starting with a packet having the missing packet order number.

20. The network of claim 19, the hardware media client module further to calculate a delay between bursts of packets based on the restart message, wherein the calculated delay is D:

$$D = T * \left(1 - \frac{(p-n)}{(s-n)}\right)$$

where,
T=a current time stamp,
p=a missing packet order number,
n=a starting packet order number, and
s=a current packet order number.

* * * * *